(12) United States Patent
Rachlin

(10) Patent No.: US 12,099,349 B2
(45) Date of Patent: *Sep. 24, 2024

(54) COORDINATING A SINGLE PROGRAM RUNNING ON MULTIPLE HOST CONTROLLERS

(71) Applicant: Honeywell International Inc., Morris Plains, NJ (US)

(72) Inventor: Elliott Harry Rachlin, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 495 days.

This patent is subject to a terminal disclaimer.

(21) Appl. No.: 17/345,608

(22) Filed: Jun. 11, 2021

(65) Prior Publication Data

US 2022/0397891 A1    Dec. 15, 2022

(51) Int. Cl.
  *G05B 19/418*   (2006.01)
  *G06F 16/23*    (2019.01)
  *G06F 16/27*    (2019.01)

(52) U.S. Cl.
  CPC ..... *G05B 19/4188* (2013.01); *G06F 16/2379* (2019.01); *G06F 16/27* (2019.01); *G05B 2219/31394* (2013.01)

(58) Field of Classification Search
  CPC ...... G05B 19/4188; G05B 2219/31394; G06F 16/27; G06F 16/2379

(Continued)

(56) References Cited

U.S. PATENT DOCUMENTS 11,604,665 B2 *  3/2023  Madtha ................ G06F 9/5072
11,762,742 B2    9/2023  McLaughlin et al.
(Continued)

FOREIGN PATENT DOCUMENTS

EP    3416014 A1    12/2018
EP    3716072 A1     9/2020
WO    2017205224 A1  11/2017

OTHER PUBLICATIONS

Extended European Search Report mailed Oct. 5, 2022, issued in connection with corresponding EP Application No. 22176169.5 (10 pages total).

*Primary Examiner* — Md Azad
(74) *Attorney, Agent, or Firm* — John Maldjian, Esq.; Stevens & Lee PC

(57) ABSTRACT

A method of process control in a PCS. The PCS provides host controllers coupled together, I/O devices, field devices, and processing equipment, configured together to run a process, the plurality of host controllers having stored a single online orchestrator program for coordinating a shared and synchronized database for the host controllers, wherein the online orchestrator program uses and tracks currently available host controllers and selected control programs for controlling the process. The PCS also includes an offline orchestrator. The orchestrator is run on the currently available host controllers that shares and synchronizes the initial shared database version to the currently available host controllers. A selected host controller responsive to an event broadcasts updated shared database version to the currently available host controllers. The offline orchestrator accepts commands relating to a deployment/undeployment of control program(s) among the currently running host controllers in response to changing requirement(s) by the control programs or an outside environment.

20 Claims, 4 Drawing Sheets

(58) Field of Classification Search
USPC .......................................................... 700/20
See application file for complete search history.

(56) References Cited

U.S. PATENT DOCUMENTS

| | | | |
|---|---|---|---|
| 2013/0096727 A1* | 4/2013 | Brandt | G05B 19/4186 |
| | | | 700/291 |
| 2018/0364673 A1* | 12/2018 | Van Wensen | G06F 11/1658 |
| 2019/0041824 A1* | 2/2019 | Chavez | G05B 19/41835 |
| 2020/0218243 A1* | 7/2020 | Liu | G05B 19/052 |
| 2020/0319623 A1 | 10/2020 | International | |
| 2021/0014113 A1 | 1/2021 | Guim et al. | |
| 2021/0089015 A1* | 3/2021 | Law | G05B 19/048 |
| 2021/0117249 A1* | 4/2021 | Doshi | H04L 67/1001 |

* cited by examiner

COORDINATING A SINGLE PROGRAM RUNNING ON MULTIPLE HOST CONTROLLERS

FIELD

Disclosed aspects relate to a process control system (PCS) including a plurality of process controllers for an industrial process facility (IPF), more specifically to synchronization and coordination of the respective process controllers referred to herein as host controllers, for the PCS.

BACKGROUND

Customers across a variety of industries including chemical, refining and oil and gas industries desire a more efficient approach to control system engineering while still taking advantage of existing systems and infrastructure. To service this need Honeywell International created the Experion PKS Highly Integrated Virtual Environment (HIVE). The HIVE decouples the assignment of I/O devices (also known as I/O modules) and control strategies from specific host controllers, focusing instead more on the control capabilities of the entire group (or HIVE) of controllers referred to herein as a controller HIVE, so that the respective host controllers are provided as a pool of host controllers.

This technology, used in the Honeywell EXPERION PKS CONTROL HIVE, enables coordinated operation of the Online Orchestrator component which is configured to position the control programs (or workloads) on various controller HIVE's host controllers. The positioning of the control programs is in a way that improves the overall computational utilization and process control performance.

In order to support redundancy, availability, and increased computing power, a PCS may include multiple host controllers that can be used to provide computational support to provide process control for the process being run in a PCS. As used herein a "host controller" also known as a process controller, generally comprises a computer that can be either physical or virtual. A physical host controller comprises real hardware and is one which generally built and sold to customers. A virtual host controller is a simulation of one type of a real computer on another type of computer. Typically, the computer for performing the simulation for realizing a virtual host controller is generally called a "server" which is much more powerful (in terms of processing speed and memory) as compared to the host controller being simulated. A single server can usually simulate multiple host computers simultaneously.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize that there are several problems in a PCS implementing a controller HIVE including multiple host controllers configured in a controller HIVE arrangement configured on a common network utilizing a shared database, where it is necessary to continuously keep the shared database synchronized in all host controllers while minimizing unnecessary network synchronization traffic. A first problem with a conventional controller HIVE arrangement is that any single database-impacting external event, such as a particular host controller powering on or powering off, can result in a broadcasted report (message) of this event by all currently running host controllers.

This broadcasted message coming from all running host controllers can generate significant traffic when it is recognized herein that only one broadcasted message is actually needed because only one event actually occurred. Because all running host controllers detect the same event at essentially the same time, they all generate the same update broadcasted message, when in reality only one update broadcasted message is needed to update the database. Disclosed aspects enable the master controller (provided it is functional) to broadcast the message in the controller HIVE's network to the other host controllers about the event only, rather, than the same broadcasted message once by every host controller in the host controllers HIVE's network to report the same event.

A second problem with a conventional controller HIVE arrangement is that synchronized multiple external events (such as the powering off or on of an entire rack of host controller(s) results in every currently-running host computer incrementing and retransmitting the database responsive to each of the external events. This process causes every currently available host controller that receives database updates to have to receive multiple update broadcasted messages of the same information from each of the multiple host controllers that broadcast the same information. It is also recognized herein that it would be desirable to reduce the number of broadcast update messages that any host controller needs to process when a system event occurs which triggers a message that all host controllers receive.

Disclosed aspects include a method of process control in a PCS of an IPF. The PCS is provided with a plurality of host controllers each comprising a processor including an associated memory communicatively coupled together by a network to a plurality of I/O devices that are coupled to a plurality of field devices which are coupled to a plurality of processing equipment all configured together to run the process, the plurality of host controllers having in their ones of the memory a single online orchestrator program for coordinating a shared and synchronized database (shared database) for the plurality of host controllers, wherein the online orchestrator program makes use of and tracks a presence of currently available ones of the plurality of host controllers and selected control programs for controlling the process, and an offline orchestrator. An online orchestrator generally comprising software; is run on currently available host controllers, the online orchestrator sharing and synchronizing the initial version of the shared database to the currently host controllers.

A selected one of the plurality of host controllers responsive to an external reportable event in the PCS broadcasting an updated version of the shared database over the network to all the currently available ones of the plurality host controllers. The offline orchestrator accepting external user-provided commands relating to the deployment or undeployment the selected control program(s) among the currently running host controllers in response to changing requirement (s) imposed by the selected control programs or by an outside environment.

DETAILED DESCRIPTION

Figure 1A:
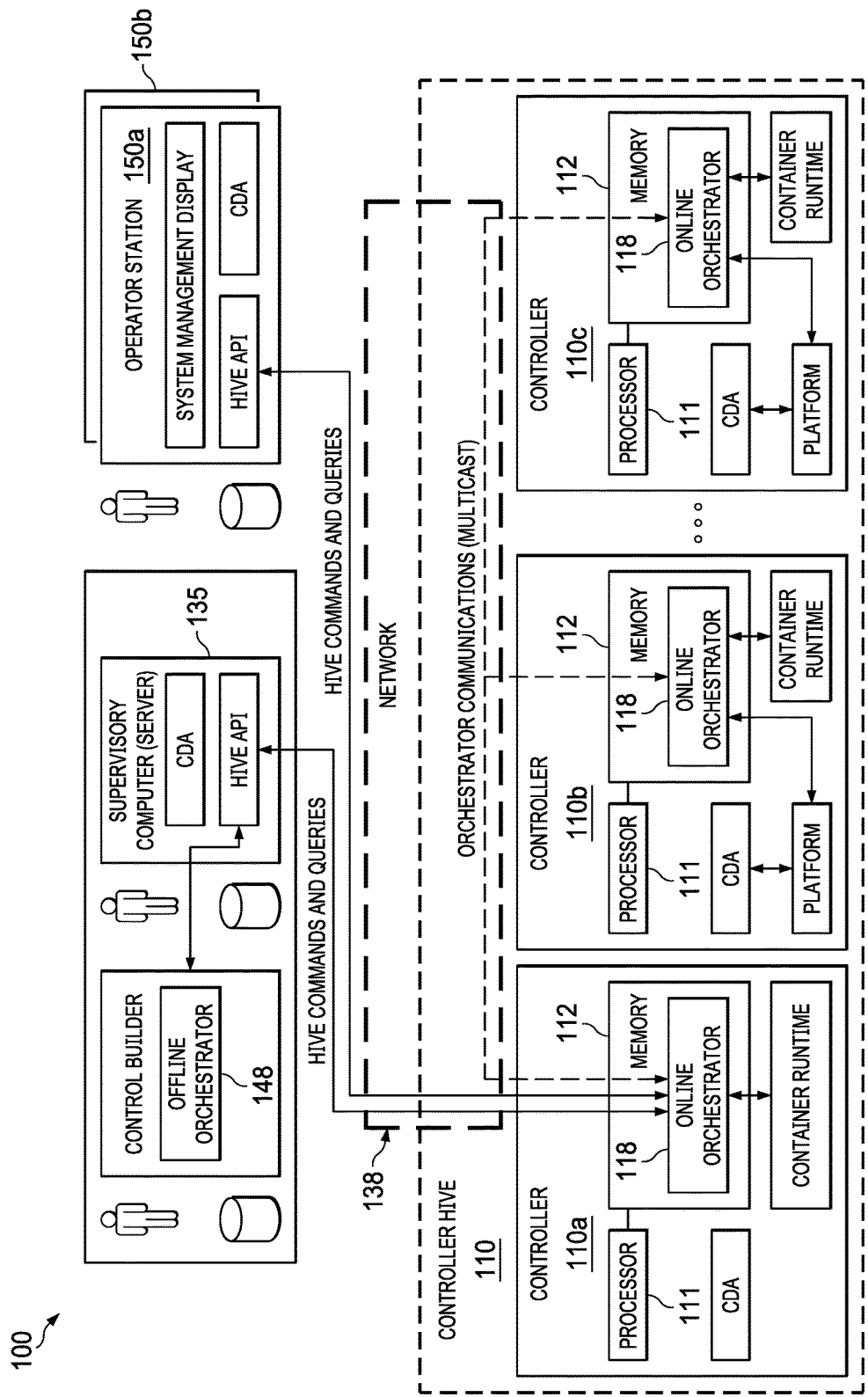
FIG. 1A depicts a disclosed HIVE architecture that includes offline orchestrator, a supervisory computer shown functioning as a server, and operator stations, according to an example aspect.

Disclosed aspects are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed aspects.

As used herein an IPF comprises a PCS configured to run an industrial process involving a tangible material that disclosed aspects apply. For example, oil and gas, chemical, beverage, pharmaceutical, pulp and paper manufacturing, petroleum processes, electrical power including renewable energy, and water. An IPF is distinct from a data processing system that only performs data manipulations.

Conventionally, control programs running in a known controller HIVE of host controllers have fixed bindings to preconfigured host controllers and thus are customized to only by handling parts of the process database which directly impact them. However, using disclosed aspects, control programs (referred to herein as an online orchestrator program that uses a shared (single) database) is run on all the host controllers), and the control programs may also be moved from host controller to host controller (dynamically as conditions warrant, such either when a running host controller fails or when externally originating user commands request the change. Even in the presence of this type of dynamism, all host controllers need to track the entire process database which is owned and used by all host controllers of the controller HIVE.

A disclosed single online orchestrator program is thus run (or is executing) on each of the host controllers in the controller HIVE which are communicatively connected together by a communications network, such as a multicast (broadcast) network. The online orchestrator program uses a shared single database, where the online orchestrator program maintains the respective host controllers in a synchronized state with respect to all of the host controllers. Thus, in contrast to a conventional fixed configuration arrangement for a controller HIVE in a PCS, this disclosed implementation supports a more dynamic execution model and solves the problem of keeping the database synchronized, or nearly synchronized, on all host controllers in the controllers HIVE, at all times.

Disclosed aspects recognize a single unified online orchestrator program can be run on all the host controllers in the controller HIVE simultaneously, where the software on each of the host controllers maintains synchronization and coordination of the shared database across all host computers. The online orchestrator program uses the shared database which it keeps in a synchronized state on all physical host controllers. This Disclosure thus includes synchronization of a shared database for multiple host controllers configured in a controller HIVE which enables the same software to run in a coordinated manner simultaneously on all of the host controllers.

Disclosed aspects recognize that a known HIVE architecture involves 3-tuples of specific host controllers, specific software for specific I/Os, and specific IT connectivity for the control loop. A disclosed HIVE architecture 100 is shown in FIG. 1A that includes an offline orchestrator 148, a supervisory computer 135 functions as a server, and operator stations 150a, 150b. The HIVE architecture 100 also includes a controller HIVE comprising a plurality of host controllers 110a, 110b, and 110c each having a processor 111 and associated memory 112 that includes storage of a disclosed online orchestrator 118.

The orchestration function provided by the online orchestrator 118 implements the process of assigning software to host controllers within the controller HIVE 110. The online orchestrator 118 is commanded by the supervisory computer 135 regarding what software to run. The online orchestrator 118 decides where that software can and should be run. These decisions can be based on one or more of resource availability, equipment compatibility, customer-specified rules, and optimization efforts.

The online orchestrator 118 thus comprises a single "distributed" application that runs in each host controller in the controller hive 110. where the online orchestrator 118 may operate in a master role or in monitor role. One of the host controllers, such as host controller 110a will be in the master role, while the remaining host controllers in the controller HIVE will be in the monitor role. It is generally a relatively minimal task is to keep all proper control programs for controlling the process run by the PCS running per system database specification (on the host controller upon which it is executing). A secondary task is generally to monitor activity of the other host controllers and update/broadcast its database if a host controller changes its status, such as being turned on or off.

Regarding terminology used herein a selected control program is an application software program that comprises a docker-compatible container which contains one or more executable threads of execution. Host controllers 110a, 110b, and 110c collectively supply a pool of resources, each generally including a processor 111 such as a central processing unit (CPU), a memory 112, disk I/O, and private network access. Control programs provide a demand for available resources. Orchestration is the process of matching up selected control programs and host controllers (demanders and suppliers) of resources in arrangements which are "good" according to some predetermined metric, such as for example based on minimum hardware, equipment compatibility, minimum wasted resources.

The task of orchestration comprises deciding where each of the control programs should be run. It does this by keeping the "actual PCS" matching the "desired PCS": The actual system is generally obtained by monitoring the container runtime for the list of control programs running on each host controller in the controller HIVE. The desired system configuration can be obtained by examining the shared online Orchestrator's 118 database. Transformations can be achieved by the online Orchestrator's 118 issuing commands (such as "spin-up" and "spin-down") to the container runtime interface which is the path through which commands are sent from the offline orchestrator 148 to the online orchestrator 118, which can be seen in FIG. 2 described below.

The HIVE architecture 100 enables any of the plurality of host controllers 110a, 110b, and 110c to connect to any of the I/O devices in the PCS (see IO devices 120a1-120a6, 120b1-120b6, and 120c1-c6 in the respective I/O cabinet enclosures 130, 131 and 132 of the I/O HIVE 120 shown in FIG. 1B described below), to be able to run every control program generally available software in the PCS, such as for example, from hard drives of the supervisory computer 135.

The HIVE architecture 100 also includes a communicable connection shown as a network 138 which may be regarded as a supervisory network that may comprise an ethernet connection, such as Honeywell's fault tolerant ethernet (FTE). The network 138 is for providing a connection for communications between the host controllers 1110a, 110b, 110c in the controller HIVE 110 and the supervisory computer 135, as well as for the host controllers in the controller HIVE 110 to the operator stations 150a, 150b.

Figure 1B:
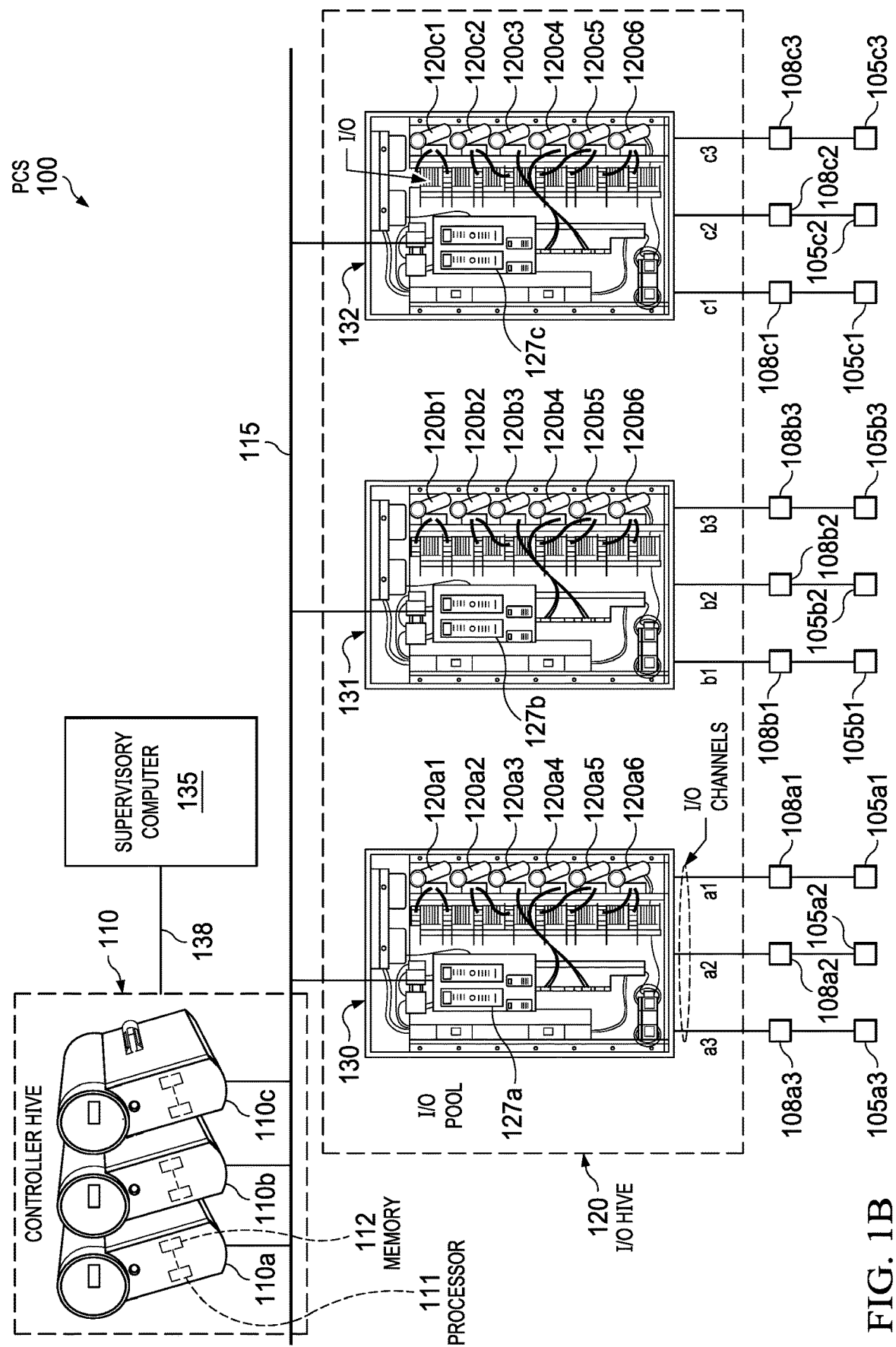
FIG. 1B depicts a portion of an example PCS of an IPF that includes both a controller HIVE that includes a plurality of host controllers and an I/O device HIVE including a plurality of I/O devices, where the PCS utilizes the disclosed coordinating of a single online orchestrator program running on multiple host controllers, according to an example aspect. In the controller HIVE, one of the host controllers has the master role and all other host controllers are in the monitor (non-master) role.

FIG. 1B depicts a portion of an example PCS 100 of an IPF that is shown including both the controller HIVE 110 shown IN FIG. 1A and an I/O device HIVE 120 that are coupled together by a lower network 115 used primarily for host controller to host controller communications, and a multicast (a messaging protocol on a network such as ethernet) network, where the PCS 100 can utilize the disclosed coordinating of a single software program shown as online orchestrator 118 running on multiple host controllers. The network 115 can also comprise a wired or a wireless network.

The controller HIVE 110 is configured to decouple the controller software (such as control programs for controlling the process run by the PCS) from the controller hardware. Specifically, the controller HIVE 110 of host controllers isolates (or compartmentalizes) software functions, such as control program execution into software modules which can be distributed using the network 115 across the host controllers in the controller HIVE 110, rather than be dedicated to a single post controller, and also provides an alternate form of redundancy rather than the traditional 1:1 redundancy. The controller HIVE 110 is as in FIG. 1A again shown by example including three (3) host controllers 110a, 110b, and 110c.

However, the controller HIVE 110 can have a different number of host controllers, generally from 1 to up to a potentially essentially unlimited number of host controllers. The PCS 100 is also again shown including a supervisory computer 135, that is on a level that is above that of the host controllers, such as production control level or plant supervisory level. The supervisory server 135 is communicatively coupled to the host controllers 110a, 110, and 110c in the controller HIVE 110 by network.

The I/O device HIVE 120 is shown including an I/O cabinet enclosures 130, 131, and 132 each including an I/O communication interface(s) 127a, 127b, 127c, also called I/O gateways. Each I/O communication interface 127a-c has multiple associated I/O modules shown in FIG. 1 having six I/O modules. Specifically, I/O cabinet enclosure 130 is shown having I/O modules 120a1, 120a2, 120a3, 120a4, 120a5 and 120a6, I/O cabinet enclosure 131 is shown having I/O modules 120b1, 120b2, 120b3, 120b4, 120b5, and 120b6, and I/O cabinet enclosure 132 is shown including I/O modules 120c1, 120c2, 120c3, 120c4, 120c5 and 120c6.

Each I/O device in the I/O device HIVE 120 generally has multiple I/O channels, shown for simplicity having with three channels, comprising channels a1, a2, and a3, for I/O devices 120a1-120a6, channels b1, b2 and b3 for I/O devices 120b1-b6, and channels c1, c2 and c3 for I/O devices 120c1-c6. Each channel is connected to different field device (comprising sensors and actuators) shown in FIG. 1, with each of channels a1, a2, a3 coupled to a single field device 108a1, 108a2, 108a3, channels b1, b2, b3 each coupled to a single field devices 108b1, 108b2, 108b3, and with channels c1, c2 and c3 each coupled to a single field devices 108c1, 108c2 and 108c3.

Each field device is shown by example only coupled to a different piece of first processing equipment shown as 105a1, 105a2, 105a3, 105b1, 105b2, 105b3, 105c1, 105c2, and 105c3 so that in the example PCS 100 shown in FIG. 1B a single channel controls each piece of the plurality of first processing equipment. However, the channels and the field devices as known in the art do not necessarily map 1:1 to the first processing equipment as shown in FIG. 1B because field devices each associated with a channel can also control the same piece of processing equipment.

Multiple host controllers 110a, 110b, 110c in the controller HIVE 110 each comprising a processor 111 having an associated memory 112 are thus effectively configured as a single scalable controller that each can run control programs to implement the controller function for the entire PCS 100. The I/O device HIVE 120 functions to decouple its I/O devices 120a1-120a6, 120b1-120b6, 120c1-120c6 from being conventionally dedicated to a specific one of the host controllers in the controller HIVE 110. The I/O devices in the I/O device HIVE 120 are thus functioning as being distributed (as with the controller HIVE 110) and thus becomes an extension of modular equipment. Any host controller 110a, 110b, 110c in the controller HIVE 110 can thus access any of the channels supported by any of the I/O devices 120a1-120a6, 120b1-120b6, 120c1-120c6 in the I/O device HIVE 120.

Figure 2:
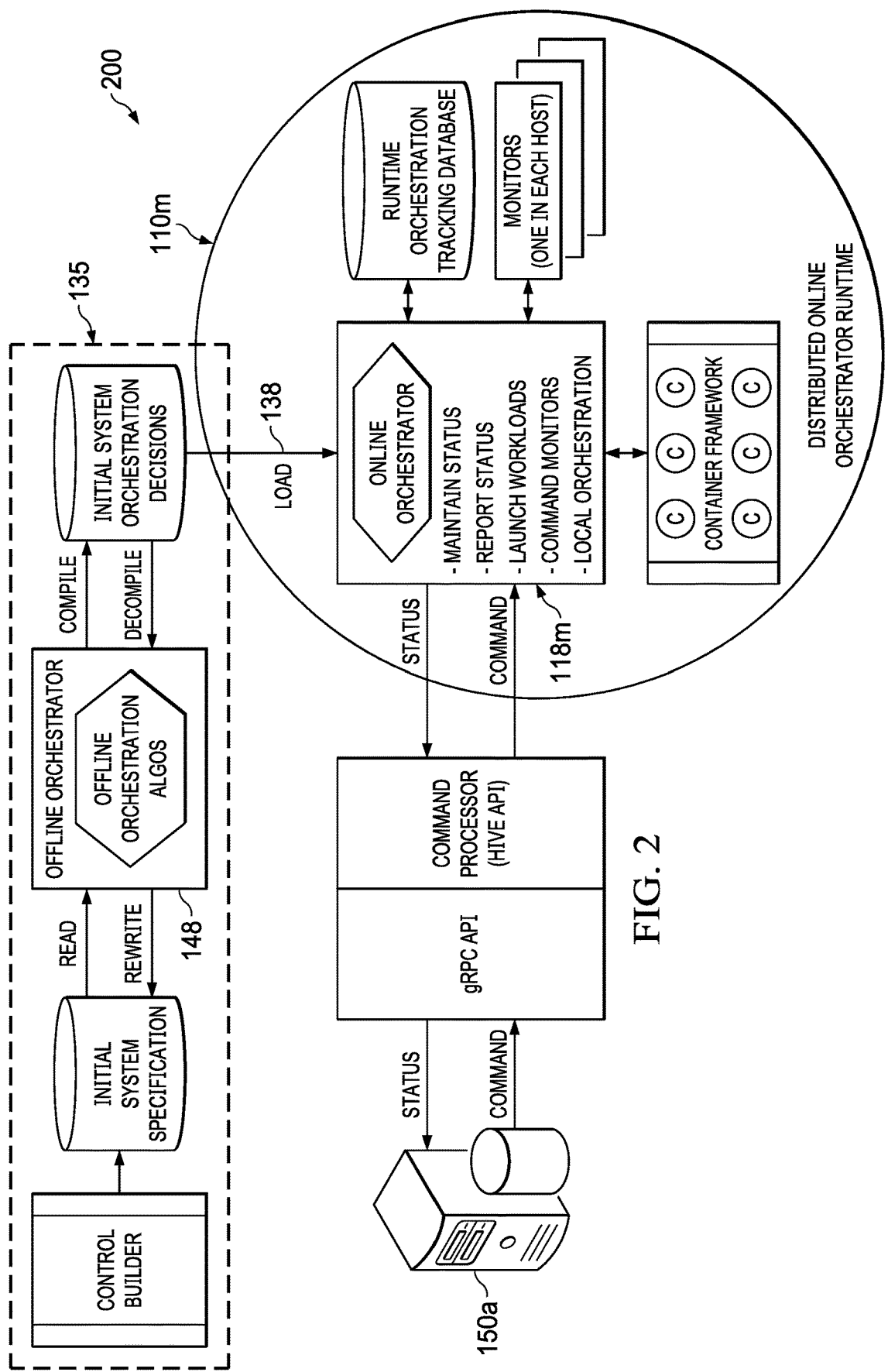
FIG. 2 is a depiction that demonstrates the interaction between the orchestrator components including an offline orchestrator shown interacting with an online orchestrator that is in the master controller role as shown.

FIG. 2 is a depiction that demonstrates the interaction between the orchestrator components including an offline orchestrator 148 provided by the supervisory computer functioning as a server shown coupled by network 138 four interacting with an online orchestrator 118 that is in the master controller role shown as host controller 110m. There is an operator station 150a shown coupled to the host controller 110m.

Regarding the shared database used by the online orchestrators such as online orchestrator 118m, an initial database version is created by the offline orchestrator 148. The database is generally versioned. Newer database versions that are received over the network 138 by the respective host controllers are adopted by the receiving host controllers. The shared databases transmitted periodically by the master host controller 110m, and a slower rate by the host controllers in the monitor role (non-masters). Changes to the shared database are generally infrequent and mostly made by the master host controller in response to external commands received. The only changes to the shared database by the host controllers functioning as monitors generally relate to the active state of the host controllers being powered on or off.

Regarding mastership determination, the first active host controller in the list of available host controllers can become the master. Active means at least one other host controller is receiving the host controller's multicast. The master functions as the "voice of the controller HIVE". The master host controller 110m alone executes commands and answers queries generally received from the operator stations, such as operator station 150*as*. However, the master host controller 110*m* will generally not do anything until at least a few seconds (such as three seconds) as the undisputed master controller to mitigate possible race conditions with others of the host controllers in the controller HIVE.

Figure 3:
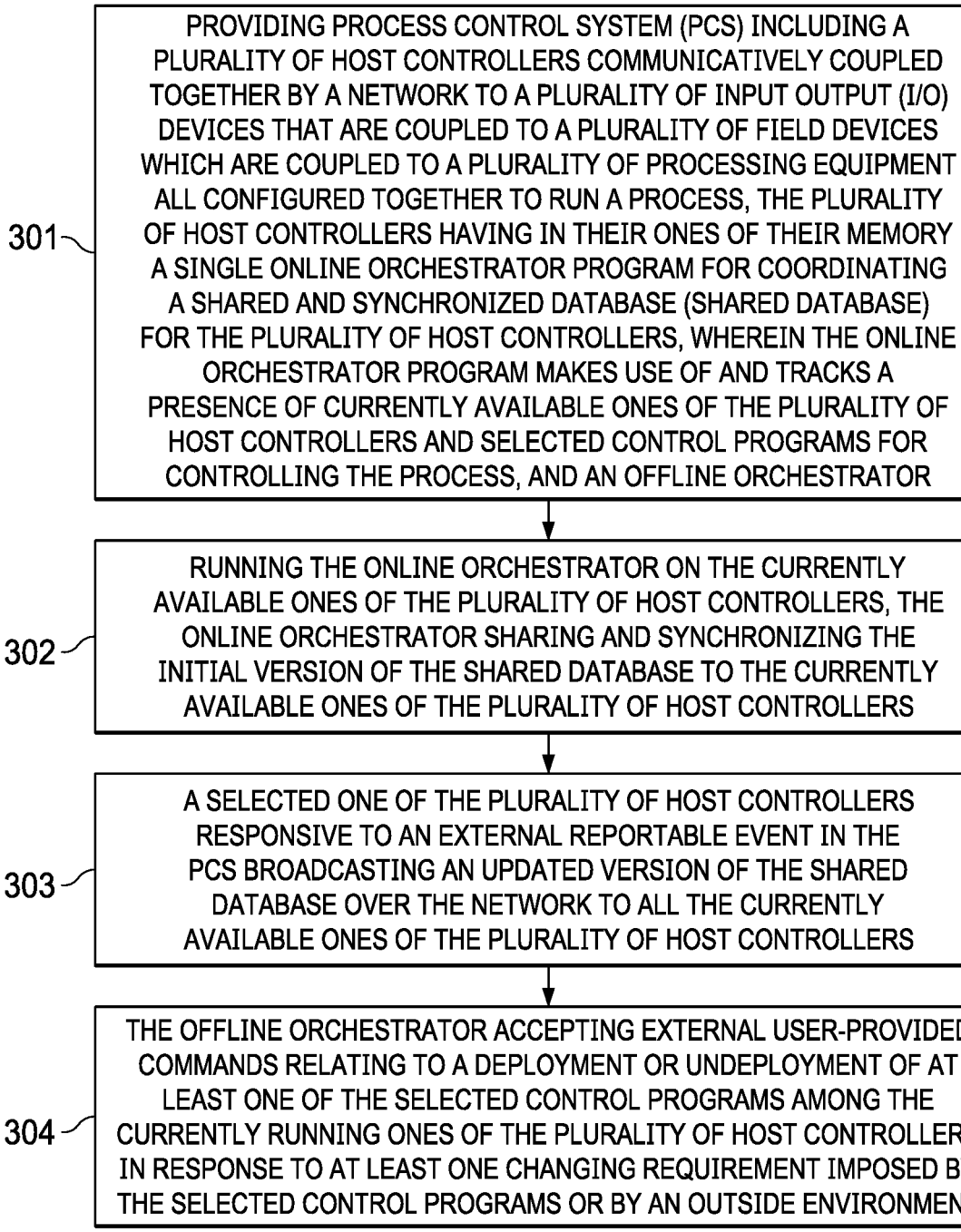
FIG. 3 is a flow chart that shows steps in a method of coordinating of a single software program running on multiple host computers, according to an example aspect.

FIG. 3 is a flow chart that shows steps in a method 300 of process control in a PCS of an IPF, where the PCS controls a process, including coordinating of a single software program running on multiple host computers, according to an example aspect. The method 300 comprises step 301 comprising providing the PCS including a plurality of host controllers (that can be mixture of physical and virtual controllers) each comprising a processor including an associated memory communicatively coupled together by a network to a plurality of input output (I/O) devices that are coupled to a plurality of field devices which are coupled to a plurality of processing equipment all configured together to run the process.

The host controllers have in their respective memories a single online orchestrator program for coordinating a shared and synchronized database being a shared database for the plurality of host controllers, wherein the online orchestrator program makes use of and tracks a presence of currently available and suitably resourced host controllers, and selected control programs for controlling the process. The PCS also includes an offline orchestrator. The PCS can comprise a distributed control system (DCS).

The offline orchestrator component of the overall orchestrator is generally used for 2 purposes and can be hosted upon a standard WINDOWS computer provided as network connectivity or another way of getting commands into the network 138. The offline orchestrator creates the initial database that all hosts controllers use when the HIVE is being started from an "all off" condition. It is also used when validating proposed changes to a running controller.

Step 302 comprises running the online orchestrator on the currently available ones of the plurality of host controller computers, the online orchestrator sharing and synchronizing the initial version of the shared database to the currently available host controllers. Step 303 comprises a selected one of the plurality of host controllers responsive to an external reportable event in the PCS broadcasting an updated version of the shared database over the network to all the currently available ones of the plurality host controllers. For example, a reportable event can be a particular host controller powering on or powering off can result in a report of this event.

Step 304 comprises the offline orchestrator accepting external user-provided commands relating to the PCS to deploy or undeploy at least one of the control programs among the currently running ones of the plurality of host controllers in response to at least one changing requirement imposed by the selected control programs or by an outside environment. An outside environment as used herein means any computer in the PCS which is outside the HIVE, including all host controllers and other computers, whether physical or virtual, which do not run the online orchestrator, and which do not directly participate in controlling the industrial process. Step 305 comprises the offline orchestrator executing those commands.

The status of the external commands is generally returned to the requester. The Offline orchestrator typically receives user/human-initiated configuration instructions from one of the operator consoles (referred to herein as "commands") which it translates into external commands that are sent via the offline orchestrator to the online orchestrators in each host controller. For example, if the user wants to run some additional application software, it sends a command to the online orchestrator to find a suitably resourced (available) host controller where it can be run. If one available host controller is found, the commanded software is initiated. If no available host controller is found to run the new software, then an error can be returned back up to the offline orchestrator where it can be displayed to the user.

Disclosed aspects also include a method of database updating, where when a broadcast over the network is received by all active host computers in the controller HIVE, if its database version number is greater than the version number currently in the host controller, then the database version number is adopted, meaning the database content, along with its version number, is saved. Otherwise, where the database version number is not greater than the database version number currently in the host controller, the broadcast is ignored, so that neither the database content, nor its version number, is saved. In this latter case, all overhead of processing the discarded message is skipped, resulting in a savings of computer time and memory.

A disclosed solution to this problem is upon detection of a reportable event requiring a change in the shared database, every running host controller fetches its unique "increment amount," then updates its local version of its database by the "increment amount". The increment amount is determined as follows: all host computers are kept in a linked list in the shared synchronized database, and each is in a fixed, generally unchanging position. Each host controller determines its increment by mapping its ordinal position (1st, 2nd, etc.) to an integer "increment amount" which is of inverted magnitude. In general, since the first host controller on the list has the smallest position, corresponding to the largest increment amount, it will be the sender whose database is universally received in preference to all other host controllers.

Because there is significant cost involved in a host controller to receive and process a database synchronization message, this method aspect significantly reduces the amount of host controller overhead for processing messages. That is because all but the database with the highest version number is ignored, and the compute time is not expended for them due to their being discarded upon receipt in response to their lower version numbers.

Also, there is the secondary benefit that the shared database becomes fully synchronized and quiescent more quickly than if updated version numbers arrive in a random order, which is the result of conventionally having all host controllers increment (assign a higher version number to their database) by the same "increment amount". This disclosed aspect eliminates the race condition that naturally occurs when all host computers increment their local database versions by the same amount prior to broadcasting the database message over the network.

There is also a tertiary benefit. The "increment amount" is selected such that the host controller currently in the master role which is the sole host computer that responds to external commands. External commands for example may come from operator keyboard actions such as reconfigurations, power-up and power-down events, and task reassignments. They will be received and processed in the host controller with the largest "increment amount" which will be the master host controller as explained below. This ensuring that the very latest version of the database is the one that is most quickly shared with all other host computers in the controller HIVE.

The reason for this is because the host computer in the MASTER role is the one which responds to external commands, which in some cases can impact the database. When that happens, the MASTER host controller's database is the latest and the best. The MASTER's database is the most up-to-date because when external commands enter the controller HIVE, they are initially received by the MASTER host controller, such as from the supervisory computer and subsequently shared, with all other currently available host controllers in the controller HIVE. This reduces the time when the overall controller HIVE database is resynchronizing.

Disclosed aspects also include the online orchestrator maintaining a database in the form of a memory element structure. Within that memory element structure are various data characterizing the current state of the controller HIVE, including but not limited to host computer information, workload Information, deployments information, and additional general status information. Also included in the database is a "database version number". Whenever the database in a single host controller is updated, its version number is incremented and the updated database is immediately broadcasted to all other host controllers in the controller HIVE.

In addition, every one second, every host controller broadcasts its current version of the database, including the database version number, to all other host computers. Whenever a host computer receives a database broadcast, it examines the included database version number and compares it with its own database version number. If the newly received database has a version number which is less than or equal to the current database's version number, then that newly arrived image of the shared database is discarded. If, however, the database version number newly received is higher than the current database version number, then the receiving host adopts the newly arrived database in place of its current, but older-versioned database currently resident in the host computer.

While various disclosed aspects have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of process control in a process control system (PCS) of an industrial processing facility (IPF), where the PCS controls a process, comprising:

providing the PCS including a plurality of host controllers each comprising a processor including an associated memory communicatively coupled together by a network to a plurality of input output (I/O) devices that are coupled to a plurality of field devices which are coupled to a plurality of processing equipment all configured together to run the process, the plurality of host controllers having in their ones of the memory a single online orchestrator program for coordinating a shared and synchronized database (shared database) for the plurality of host controllers, wherein the online orchestrator program makes use of and tracks a presence of currently available ones of the plurality of host controllers and selected control programs for controlling the process, and an offline orchestrator;

running the online orchestrator program on the currently available ones of the plurality of host controllers, the online orchestrator program sharing and synchronizing an initial version of the shared database to the currently available ones of plurality of host controllers;

a selected one of the plurality of host controllers responsive to an external reportable event in the PCS broadcasting an updated version of the shared database over the network to all the currently available ones of the plurality host controllers, and the offline orchestrator accepting external user-provided commands relating to a deployment or undeployment of at least one of the selected control programs among the currently running ones of the plurality of host controllers in response to at least one changing requirement imposed by the selected control programs or by an outside environment.

2. The method of claim 1, wherein when the updated version of the shared database is received by the currently available ones of the plurality of host controllers, the currently available ones of the plurality of host controllers determining whether its database version number is greater than a version number currently in the host controller, then it is adopted, otherwise it is ignored.

3. The method of claim 2, wherein a selecting step for selecting the one of the plurality of host controllers takes place responsive to detection of the external reportable event provided the external reportable event is determined to require a change in the shared database, each currently available one of the plurality of host controllers selecting a unique increment amount, updating its local version of the shared database by the unique increment amount, and broadcasting the local version of the shared database over the network, where only one of the plurality of host controllers will have the largest of the increment amount and after broadcasting that, all other host controllers, upon receipt of the updated version of the database, will adopt the updated version of the database, and all other broadcasts of the database from all other host controllers will have lower version number of the shared database so that their broadcasts will then be ignored by all receiving ones of the plurality of host controllers.

4. The method of claim 1, wherein the PCS comprises a distributed control system (DCS).

5. The method of claim 1, wherein the external user-provided commands are provided by a supervisory computer configured to function as a server.

6. The method of claim 5, wherein the offline orchestrator is implemented by the supervisory computer, and wherein the offline orchestrator further provides validating of proposed changes to a controller HIVE.

7. The method of claim 6, wherein the plurality of I/O devices are configured in a I/O HIVE, so that any of the plurality of host controllers in the controller HIVE accesses a channel of multiple channels supported by any of the plurality of I/O devices.

8. A process control system (PCS) of an industrial process facility (IPF) configured to control a process, comprising:

the PCS including a plurality of host controllers each comprising a processor including an associated memory communicatively coupled together by a network to a plurality of input output (I/O) devices that are coupled to a plurality of field devices which are coupled to a plurality of processing equipment all configured together to run the process, the plurality of host controllers having in their ones of the memory a single online orchestrator program for coordinating a shared and synchronized database (shared database) for the plurality of host controllers, wherein the online orchestrator program makes use of and tracks a presence of currently available ones of the plurality of host controllers and selected control programs for controlling the process, and an offline orchestrator;

the currently available ones of the plurality of host controllers for running the online orchestrator program and sharing and synchronizing an initial version of the shared database to the currently available ones of plurality of host controllers;

a selected one of the plurality of host controllers responsive to an external reportable event in the PCS broadcasting an updated version of the shared database over the network to all the currently available ones of the plurality host controllers, and the offline orchestrator for accepting external user-provided commands relating to a deployment or undeployment of at least one of the selected control programs among the currently running ones of the plurality of host controllers in response to at least one changing requirement imposed by the selected control programs or by an outside environment.

9. The system of claim 8, wherein when the updated version of the shared database is received by the currently available ones of the plurality of host controllers, the currently available ones of the plurality of host controllers determining whether its database version number is greater than a version number currently in the host controller, then it is adopted, otherwise it is ignored.

10. The system of claim 9, wherein a selecting step for selecting the one of the plurality of host controllers takes place responsive to detection of the external reportable event provided the external reportable event is determined to require a change in the shared database, each currently available one of the plurality of host controllers selecting a unique increment amount, updating its local version of the shared database by the unique increment amount, and broadcasting the local version of the shared database over the network, where only one of the plurality of host controllers will have the largest of the increment amount and after broadcasting that, all other host controllers, upon receipt of the updated version of the database, will adopt the updated version of the database, and all other broadcasts of the database from all other host controllers will have lower version number of the shared database so that their broadcasts will then be ignored by all receiving ones of the plurality of host controllers.

11. The system of claim 8, wherein the PCS comprises a distributed control system (DCS).

12. The system of claim 8, further comprising a supervisory computer functioning as a server coupled to a controller HIVE by a supervisory network, wherein the external user-provided commands are provided by the supervisory computer configured to function as the server.

13. The system of claim 2, wherein the plurality of I/O devices are configured in a I/O HIVE, so that any of the plurality of host controllers in the controller HIVE accesses a channel of multiple channels supported by any of the plurality of I/O devices.

14. A non-transitory computer readable medium containing instruction for implementing a method of process control in a process control system (PCS) of an industrial processing facility (IPF), where the PCS controls a process, wherein the PCS includes a plurality of host controllers each comprising a processor including an associated memory communicatively coupled together by a network to a plurality of input output (I/O) devices that are coupled to a plurality of field devices which are coupled to a plurality of processing equipment all configured together to run the process, the plurality of host controllers having in their ones of the memory a single online orchestrator program for coordinating a shared and synchronized database (shared database) for the plurality of host controllers, wherein the online orchestrator program makes use of and tracks a presence of currently available ones of the plurality of host controllers and selected control programs for controlling the process, and an offline orchestrator;

running the online orchestrator program on the currently available ones of the plurality of host controllers, the online orchestrator program sharing and synchronizing an initial version of the shared database to the currently available ones of plurality of host controllers;

a selected one of the plurality of host controllers responsive to an external reportable event in the PCS broadcasting an updated version of the shared database over the network to all the currently available ones of the plurality host controllers, and the offline orchestrator accepting external user-provided commands relating to a deployment or undeployment of at least one of the selected control programs among the currently running ones of the plurality of host controllers in response to at least one changing requirement imposed by the selected control programs or by an outside environment.

15. The non-transitory computer readable medium of claim 14, wherein when the updated version of the shared database is received by the currently available ones of the plurality of host controllers, the currently available ones of the plurality of host controllers determining whether its database version number is greater than a version number currently in the host controller, then it is adopted, otherwise it is ignored.

16. The non-transitory computer readable medium of claim 15, wherein a selecting step for selecting the one of the plurality of host controllers takes place responsive to detection of the external reportable event provided the external reportable event is determined to require a change in the shared database, each currently available one of the plurality of host controllers selecting a unique increment amount, updating its local version of the shared database by the unique increment amount, and broadcasting the local version of the shared database over the network, where only one of the plurality of host controllers will have the largest of the increment amount and after broadcasting that, all other host controllers, upon receipt of the updated version of the shared database, will adopt the updated version of the shared database, and all other broadcasts of the shared database from all other host controllers will have lower version number of the shared database so that their broadcasts will then be ignored by all receiving ones of the plurality of host controllers.

17. The non-transitory computer readable medium of claim 14, wherein the PCS further comprises a supervisory computer functioning as a server coupled to a controller HIVE by a supervisory network, and wherein the external user-provided commands are provided by the supervisory computer configured to function as the server.

18. The non-transitory computer readable medium of claim 17, wherein the plurality of I/O devices are configured in a I/O HIVE, so that any of the plurality of host controllers in the controller HIVE accesses a channel of multiple channels supported by any of the plurality of I/O devices.

19. The non-transitory computer readable medium of claim 14, wherein the PCS comprises a distributed control system (DCS).

20. The non-transitory computer readable medium of claim 14, wherein the offline orchestrator is implemented by a supervisory computer, and wherein the offline orchestrator further provides validating of proposed changes to a controller HIVE.

\* \* \* \* \*